US011946297B2

(12) United States Patent
Hjertqvist

(10) Patent No.: US 11,946,297 B2
(45) Date of Patent: Apr. 2, 2024

(54) REARRANGABLE LOCKING ASSEMBLY FOR A DOOR

(71) Applicant: Industrilås i Nässjö Aktiebolag, Nässjö (SE)

(72) Inventor: Eric Hjertqvist, Nässjö (SE)

(73) Assignee: Industrilås i Nässjö Aktiebolag, Nässjö (SE)

( * ) Notice: Subject to any disclaimer, the term of this patent is extended or adjusted under 35 U.S.C. 154(b) by 238 days.

(21) Appl. No.: 17/298,700

(22) PCT Filed: Feb. 18, 2020

(86) PCT No.: PCT/EP2020/054160
§ 371 (c)(1),
(2) Date: Jun. 1, 2021

(87) PCT Pub. No.: WO2020/169558
PCT Pub. Date: Aug. 27, 2020

(65) Prior Publication Data

US 2022/0049527 A1 Feb. 17, 2022

(30) Foreign Application Priority Data

Feb. 18, 2019 (EP) .................................... 19157727

(51) Int. Cl.
*E05C 9/02* (2006.01)
*E05B 63/04* (2006.01)

(52) U.S. Cl.
CPC .............. *E05C 9/021* (2013.01); *E05B 63/04* (2013.01)

(58) Field of Classification Search
CPC ........ E05C 9/021; E05C 9/006; E05C 10/001; E05B 63/04

(Continued)

(56) References Cited

U.S. PATENT DOCUMENTS 4,998,757 A 3/1991 Ramsauer
5,642,909 A * 7/1997 Swan .................... E05C 9/1841 292/25

(Continued)

FOREIGN PATENT DOCUMENTS

CN 113153013 A * 7/2021 ............ E05B 15/00
DE 90 10 175 U1 9/1990

(Continued)

OTHER PUBLICATIONS

PCT Search Report and Written Opinion for corresponding PCT International Application No. PCT/EP2020/054160.

(Continued)

*Primary Examiner* — Kristina R Fulton
*Assistant Examiner* — James Edward Ignaczewski
(74) *Attorney, Agent, or Firm* — Olive Law Group, PLLC

(57) ABSTRACT

The present application relates to a locking assembly for facilitated reconfiguring of a door between left hand swing operative use and right hand swing operative use. The locking assembly comprising a locking mechanism configured to secure a door to a door frame in a locking state; at least one door bracket by which the locking mechanism is arranged to the door; a control mechanism comprising a housing and a coupling member configured to couple to a handle, wherein the control mechanism, in a first operative position relative said at least one door bracket, is configured to actuate the locking mechanism out of the locking state by operatively moving the coupling member relative the housing in a first direction, and wherein the control mechanism is configured to be moved from the first operative position relative said at least one door bracket to a second operative position relative said at least one door bracket, in which second operative position the control mechanism is configured to actuate the locking mechanism out of the locking (Continued)

state by operatively moving the coupling member relative the housing in a second direction different from said first direction.

12 Claims, 6 Drawing Sheets

(58) Field of Classification Search
USPC ........................................................... 292/35
See application file for complete search history.

(56) References Cited

U.S. PATENT DOCUMENTS

| | | | | | |
|---|---|---|---|---|---|
| 5,722,269 | A | | 3/1998 | Simon et al. | |
| 6,161,881 | A | * | 12/2000 | Babka | E05C 9/021 292/26 |
| 9,593,516 | B2 | * | 3/2017 | Nakanishi | E05B 17/2038 |

FOREIGN PATENT DOCUMENTS

| | | | | | |
|---|---|---|---|---|---|
| DE | 9010175 | U1 | | 9/1990 | |
| DE | 195 36 906 | C1 | | 11/1996 | |
| DE | 19536906 | C1 | | 11/1996 | |
| EP | 0 261 267 | A1 | | 9/1986 | |
| EP | 261267 | A1 | | 3/1988 | |
| EP | 0589170 | A1 | * | 7/1993 | E05C 9/04 |
| EP | 1 350 907 | A2 | | 2/2003 | |
| EP | 1350907 | A2 | | 5/2003 | |
| FR | 2 915 229 | A1 | | 10/2008 | |
| FR | 2915229 | A1 | * | 10/2008 | E05B 63/04 |
| FR | 2915229 | A1 | | 10/2008 | |
| GB | 2072740 | A | * | 10/1981 | E05C 9/021 |
| GB | 2352792 | A | * | 2/2001 | E05C 9/021 |

OTHER PUBLICATIONS

Examination Report dated Feb. 17, 2022 in associated Indian Patent Application No. 202127023337 (7 pages).

* cited by examiner

REARRANGABLE LOCKING ASSEMBLY FOR A DOOR

CROSS REFERENCE TO RELATED APPLICATIONS

This application is a 35 USC 371 application of International PCT Patent Application No. PCT/EP2020/054160, filed on Feb. 18, 2020, which claims priority to European Patent Application No. 19157727.9, filed on Feb. 18, 2019; the contents of which are hereby incorporated by reference herein in their entireties.

TECHNICAL FIELD

The present disclosure relates to a locking assembly for arrangement to a door, and in particular to a locking assembly for facilitated reconfiguring of a door between left hand swing operative use and right hand swing operative use.

BACKGROUND

In some situations, it may be necessary to reconfigure a door between left hand swing operative use and right hand swing operative use. This presupposes that hinges coupling the door to a door frame are relocated from one vertical edge of the door to an opposite vertical edge of the door. Likewise, the hinges must be relocated from one vertical edge of the door frame to an opposite vertical edge of the door frame. Conventionally, it is also necessary to relocate a door's locking assembly and handle in a similar manner. Hence, when reconfiguring a door for either left hand swing operative use or right hand swing operative use, it is in practice necessary to relocate virtually every part of a door.

The most cumbersome part to relocate is typically the locking assembly since it is generally more complex in nature and thus requires more fasteners in order to be adequately fastened in position as compared to the handle or the hinges. Moreover, one particular type of locking assembly, sometimes referred to as an "espagnolette", comprises a locking rod operatively moveable by the handle to actuate unlocking of one or more locking mechanisms dispositioned along the vertical edge of the door of which the door opens. With such a locking assembly, it is necessary to interact with many more fasteners in order to reconfigure a door between left hand swing operative use and right hand swing operative use. This consequently increases the time it takes to reconfigure a door for either left hand swing operative use or right hand swing operative use.

Hence, there is a need for an improved locking assembly which allows for a facilitated reconfiguring of a door between left hand swing operative use and right hand swing operative use.

SUMMARY

It is an object of the present invention to provide an improved solution that alleviates the mentioned drawbacks with present solutions. Furthermore, it is an object to provide a locking assembly which allows for easy reconfiguring of a door between left hand swing operative use and right hand swing operative use. By left hand swing and right hand swing operative use, it may be meant to refer to about which side a door is hinged to a door frame when facing the door. Left hand swing operative use may correspond to the case where the hinges are positioned on the left side of a door. Likewise, right hand swing operative use may correspond to the case where the hinges are positioned on the right side of a door. The directions "right" and "left" may be chosen as the directions right and left as seen when facing the door side on which a handle is arranged.

The invention is defined by the appended independent claims, with embodiments being set forth in the appended dependent claims, in the following description and in the drawings.

According to a first aspect of the invention, a locking assembly for a door is provided. The locking assembly comprises a locking mechanism configured to lock a door to a door frame in a locking state. The locking assembly comprises at least one door bracket by which the locking mechanism is arranged to the door. The locking assembly comprises a control mechanism comprising a housing and a coupling member. The control mechanism is, in a first operative position relative said at least one door bracket, configured to actuate the locking mechanism out of the locking state by operatively moving the coupling member relative the housing in a first direction. The control mechanism is configured to be moved from the first operative position relative said at least one door bracket to a second operative position relative said at least one door bracket. The control mechanism is in the second operative position configured to actuate the locking mechanism out of the locking state by operatively moving the coupling member relative the housing in a second direction different from said first direction.

By locking state, it may be meant that the locking mechanism, when in said locking state, prevents a door from being released from a door frame. Likewise, by unlocked state, it may mean that the locking mechanism, when actuated out of the locking state, no longer prevents the door from being released from the door frame. The door may be releasable from the door frame when the locking mechanism is in an unlocked state.

By the terms "couple" and/or "coupling", it may be used to characterize a component either directly or indirectly connecting two components. Also, by the terms "operative" and/or "operatively", it may be meant to characterize a motion associated with an intended function of the invention.

By "operative position", it may be meant that the control mechanism is positioned in a position where operative control is established between a handle connected to the control mechanism and the locking mechanism so that when operatively moving a handle into an unlocking position, the locking mechanism is consequently actuated out of a locking state, thereby allowing a door to be opened. The control mechanism may be configured to convert an operative motion of the handle to an operative motion of the locking mechanism so that it is actuated out of its locking state. Additionally, the control mechanism may be configured to convert an operative motion of the handle to an operative motion of the locking mechanism so that it is actuated into its locking state.

Moreover, the door may be equipped with a handle arrangement. The handle arrangement conventionally comprises a handle. The handle arrangement may also comprise a fixating structure, for instance a handle housing, configured to be arranged to the door. The handle may be configured to be at least partially enclosed by the housing when not being used. The handle housing may be configured to be fastened directly to the door in corresponding fastening holes. The handle arrangement may comprise a fixating bracket arranged on an opposite side of a door relative the handle. The fixating bracket may be fixedly arranged to the handle housing using fasteners, such as screws. Thus, the handle may be further secured in place.

Moreover, the locking assembly may be configured to be arranged to a door so that one of the first and second operative positions of the control mechanism corresponds to a left hand swing operative use of the door, and the other of the first and second operative positions corresponds to the right hand swing operative use of the door. The locking assembly may thus advantageously allow for either left hand swing operative use or right hand swing operative use of a door when the locking assembly is arranged to said door and the control mechanism is configured into one of the first operative positions. By moving the control mechanism between the first operative position and the second operative position, the locking assembly may be reconfigured between right hand swing operative use and left hand swing operative use. This method of reconfiguring may be carried out as follows.

A door comprising the locking assembly according to the first aspect of the invention may initially be configured for, say, left hand swing operative use. The door may then be reconfigured for right hand swing operative use by moving the control mechanism from a first operative position to a second operative position. When repositioned, the control mechanism may allow for coupling to the handle arrangement but upside down relative its previous position. Then, by turning the door upside down, and relocating the hinges from the left door frame edge to the right door frame edge, the door may be hinged in position to the door frame. Hence, the locking assembly is no longer required to be removed from the door and repositioned to the door. Only the handle, and the hinge part(s) of the door frame, needs to be relocated, thereby decreasing the installation time. Moreover, since a door must in any case be removed from the door frame, it is assumed that the flipping of the door upside down does not significantly increase the time it takes to reconfigure a door.

The locking assembly may be configured so that the control mechanism is moved between the first and second operative position using a translational motion. The locking assembly may be configured so that the control mechanism is moved between the first and second operative position using a rotational motion. The locking assembly may be configured so that the control mechanism is moved between the first and second operative position using both a translational motion and a rotational motion. The control mechanism may be moved using one of said motions, or a combination thereof, along said first direction or along the second direction, the second direction being different than the first direction. The second direction may be the first direction taken backwards. The second direction may be opposite the first direction.

According to one embodiment, the locking assembly may comprise a door frame bracket. The door frame bracket may be configured to be arranged to a door frame. The door frame bracket and the door bracket may be configured to connect to each other when said door is in a closed position. The locking assembly may further comprise a keeping member linearly moveable relative the door bracket. The keeping member may be configured to, in a keeping position, keep the door frame bracket and the door bracket connected. The locking mechanism may be constituted by a combination of a door frame bracket, a door bracket, and a keeping member. The locking mechanism may comprise other components as well. By this embodiment, a cost effective and reliable way of locking a door to a door frame is provided. The locking assembly may comprise at least two door brackets configured to be securely mounted on said door to connect with a corresponding set of at least two door frame brackets. The locking assembly may comprise any number of door brackets and door frame brackets. For instance, the locking assembly may comprise one pair of a door frame bracket and a door bracket, two pairs, three pairs, four pairs, five pairs, six pairs, seven pairs, eight pairs, or more, of a door frame bracket and a door bracket. Each pair of a door frame bracket and a door bracket may be provided with a keeping member coupled to the locking rod.

According to one embodiment, the control mechanism may be configured to actuate the locking mechanism by means of a locking rod coupled to the control mechanism and the locking mechanism. The locking rod may extend substantially along one direction, thereby defining a longitudinal axis. The locking rod may be configured to be operatively moveable along a longitudinal direction parallel to said longitudinal axis. The locking rod may have a cross section along a longitudinal axis of the locking rod which is either circular, semi-circular, oval, rectangular, square-shaped, triangular, or any other suitable geometric shape. The locking rod may be a flat rod, i.e. the locking rod is provided with a rectangular cross section along its longitudinal axis where one side is significantly larger than the other dimension. By this embodiment, the control mechanism and the locking mechanism may be arranged away from each other, and it may allow the control mechanism to be operatively coupled to a plurality of locking mechanisms, each of which are being actuated into an unlocking state by moving the locking rod in one direction about its longitudinal direction. The locking rod may also allow actuation of each locking mechanism into a locking state by operatively moving the locking rod.

According to one embodiment, the coupling member may be arranged rotatable relative the housing. The coupling member may be provided with cog teeth configured to engage with a control member. The control member may be configured to move linearly relative the housing. Alternatively, the coupling member may be configured in another way to connect to the control member such that the control member may move linearly relative to the housing. The control member may be coupled to the locking rod. By this embodiment, an operative motion of a handle operatively coupled to the control mechanism may be transferred to the locking mechanism to control the locking state thereof. The control member may have an elongated shape. The control member may comprise a set of grooves configured to receive cog teeth of the coupling member. The control member may be coupled to the locking rod via a fastener, such as a screw, a pin, a nut and bolt, or the like. The control member may move linearly in a first linear direction when the coupling member is moved in the first direction, and in a second linear direction when the coupling member is moved in the second direction. The first linear direction and the second linear direction may be opposite linear directions relative to the housing. Since the housing may have been moved from the first operative position to the second operative position, the opposite linear directions may provide a movement of the locking mechanism in the same direction in both operative positions of the control mechanism.

According to one alternate embodiment, the control member may be releasable from the locking rod, thereby allowing the control mechanism to be moved between the first operative position and the second operative position. After the control mechanism has been moved to a new operative position, the control member may be recoupled to the locking rod.

According to one embodiment, the control member is arranged to move linearly relative the housing in a control slot positioned at a housing side adjacent to the locking rod. The control slot may have a first open end through which the control slot opens to an outside of the housing. The control slot may have a second open end through which the control slot opens to an outside of the housing. One longitudinal edge of the control slot may open towards the cavity configured to hold the coupling member. The longitudinal opening may be sufficiently wide so that cog teeth of the coupling member may easily engage with said grooves provided on the control member. The control slot may have a shape corresponding to the shape of the control member albeit being slightly wider to allow for the control member to slide relative the housing in said control slot. The control member may be configured to be moveable relative said housing to increasingly or decreasingly protrude through one of said open ends of the control slot of the housing. It may be configured to increasingly or decreasingly protrude through any of said open ends of the control slot of the housing. The control member may be configured to couple to the locking rod via its protruding end.

According to one embodiment, the control member and the locking rod are mutually parallel when the control mechanism is positioned in an operative position. By this embodiment, an operative motion of the handle is more easily converted as an operative motion of the locking mechanism.

According to one embodiment, the coupling member may comprise two substantially identical coupling portions arranged on opposite sides of the control mechanism by which coupling portions the control mechanism may be configured to couple to a handle. By this embodiment, the control mechanism allows for more ways for the coupling member to couple to the handle.

According to one embodiment, the coupling member may be provided with a coupling aperture traversing through the coupling member between said coupling portions. The coupling aperture may be configured to receive a handle.

According to one embodiment, the control mechanism may be pivotably coupled to the locking rod. The control mechanism may be pivotable relative the locking rod between the first operative position and the second operative position. By this embodiment, the control mechanism may advantageously be moved between two operative positions, without releasing the control member from the locking rod. In order to move the control mechanism between the first operative position and the second operative position, the control mechanism may be rotated about 180 degrees about a pivotal axis extending through the pivot point.

According to one embodiment, the control mechanism remains pivotably coupled to the locking rod when moved between the first operative position and the second operative position.

According to one embodiment, the control mechanism may be configured to be pivotable around an axis perpendicular to a longitudinal axis of the locking rod. By this embodiment, the locking assembly may advantageously take up less space when arranged to a door.

According to one embodiment, the control mechanism may be configured to be pivotable parallel to a plane perpendicular to a door plane of the door when mounted thereto.

According to one embodiment, the locking rod may comprise a portion transversally displaced from a longitudinal axis of the locking rod. The longitudinal axis may be defined by the extension of at least one non-displaced portion. The displaced portion may be arranged in-between two non-displaced portions. The two non-displaced portions may be aligned along one axis. Both the transversally displaced portion and a non-displaced portion of the locking rod may be parallel to the longitudinal axis of the locking rod. The control mechanism may be configured to be positioned adjacent to the transversally displaced portion when in an operative position. By this embodiment, the locking assembly may advantageously be provided in a more compact form factor. The control mechanism may be configured to couple to the transversally displaced portion of the locking rod. When arranged to a door, the control mechanism may be positioned between an edge of the door and the locking rod, thereby allowing the locking rod to reach locking mechanisms located closer to the edge of a door.

According to one embodiment, the control mechanism may be coupled to the transversally displaced portion of the locking rod. By this embodiment, the locking assembly may be provided in a more compact form factor.

According to one embodiment, the locking assembly may comprise a locking rod stop. The locking rod stop may be configured to limit the range of motion of the locking rod by abutting a door bracket. By this embodiment, the locking rod may advantageously be prevented from being displaced beyond a safe range, thereby improving the reliability of the locking assembly and/or the door.

According to one embodiment, the control mechanism may comprise a through-hole for receiving a screw to secure the control mechanism in an operative position. The control mechanism may comprise a second through-hole for receiving a screw to secure the control mechanism in an operative position. The control mechanism may be secured in an operative position by other fastening means also, for instance nuts, bolts or other mechanical fastener. The control mechanism may be provided with clamps allowing the control mechanism to be clamped in position. The control mechanism may comprise a slot bracket configured to be arranged to the door, and the housing may be configured to be positioned in said slot and secured in place in any of the first or second operative position when coupled to the handle. For instance, the housing may be provided with rails to engage with said slot bracket.

According to a second aspect of the invention, a door comprising a locking assembly according to any embodiments herein disclosed is provided. The door also comprises a handle arrangement operatively coupled to the locking assembly. The door may hence be advantageously reconfigured for left hand swing operative use or right hand swing operative use. The door may comprise a first coupling aperture through which the handle is configured to couple to the locking assembly. The door may comprise a second coupling aperture arranged adjacent to the first coupling aperture. The locking assembly may be configured so that the control mechanism, when in an operative position, is positioned in front of one of said coupling apertures of the door. The handle may thus be appropriately arranged to the door so that it couples to the control mechanism regardless of which coupling aperture it is positioned in front of. This may involve flipping the handle in place. It may involve flipping the handle 180 degrees.

According to a third aspect of the invention, a method of reconfiguring a door according to any of previously detailed embodiments between left hand swing operative use and right hand swing operative use is provided. The method comprises a step of releasing the control mechanism from a first operative position. The method comprises a step of removing a handle arrangement comprising a handle from the door. The method comprises a step of moving the control mechanism from the first operative position to a second operative position. The method comprises a step of reorienting the door, for instance by flipping the door 180 degrees. The method comprises a step of reattaching the handle arrangement to the door. The method comprises a step of reattaching the control mechanism to the handle arrangement. By this method, a convenient and cost-effective method of reconfiguring a door for either left hand swing operative use or right hand swing operative use is provided.

According to a fourth aspect of the invention, a use of a locking assembly according to any of previously detailed embodiments for reconfiguring a door between left hand swing operative use and right hand swing operative use is provided.

BRIEF DESCRIPTION OF THE DRAWINGS

The invention will in the following be described in more detail with reference to the enclosed drawings, wherein.

DESCRIPTION OF EMBODIMENTS

Figure 1:
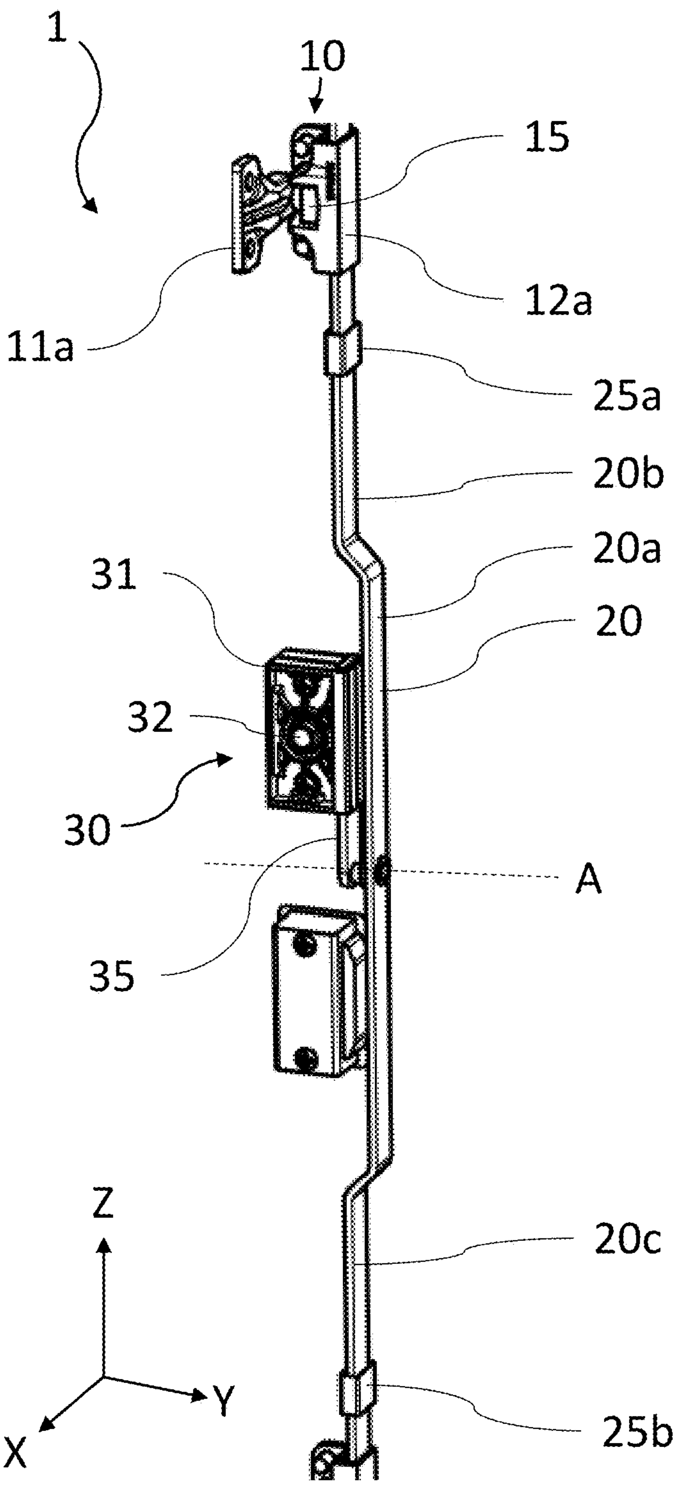
FIG. 1 shows a perspective view of the locking assembly according to one embodiment of the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1 shows a perspective view of the locking assembly 1 according to one embodiment of the invention. The locking assembly 1 is configured to be arranged to a door

100 hinged to a door frame 110. In the following, a door 100 is assumed to be either left hand or right hand swing operated. By left hand or right hand swing operated, it is meant that the door 100 is hinged to a door frame 110 about either the left edge or the right edge of the door 100, respectively, as seen when facing the side of the door 100 to which a handle 50*a* of a handle arrangement 50 is arranged. Also, in the following, the locking assembly 1 is assumed to be arranged to a door 100 aligned with a plane YZ when in a closed position. The door 100 is opened by swinging the door 100 about the hinges in a direction perpendicular to said plane YZ. The hinge axis about which the door 100 is hinged is oriented parallel to axis Z. In general, the axis Z is a vertical axis. In the following, a handle arrangement 50 arranged to the door 100 is assumed to be arranged on an outwardly facing side of the door 100. The locking assembly 1 on the other hand is assumed to be arranged on an inwardly facing side of the door 100. The door 100 is also assumed to open in an outwardly direction, but may also, or alternatively, open in an inwardly direction. The door is also assumed to be provided with at least one coupling aperture 100*a*, 100*b* through which a handle 50*a* can be coupled to the locking assembly 1. In the following, the locking assembly 1 is described in association with a door 100 provided with two coupling apertures 100*a*, 100*b* arranged adjacent to each other, wherein one is arranged above the other.

The locking assembly 1 comprises at least one door frame bracket 11*a*, 11*b*, at least one door bracket 12*a*, 12*b*, a keeping member 15, a locking rod 20, and a control mechanism 30. As can be seen in e.g. FIGS. 2-3, the at least one door frame bracket 11*a*, 11*b* is configured to be arranged to a door frame 110. The at least one door bracket 12*a*, 12*b* is configured to be arranged to a door 100. The at least one door frame bracket 11*a*, 11*b* and the at least one door bracket 12*a*, 12*b* are configured to be arranged to the door frame 110 and the door 100 respectively so that they connect when closing the door 100 into the door frame 110. In other words, they are substantially arranged at the same vertical level on the door frame 110 and the door 100 respectively. The at least one door frame bracket 11*a*, 11*b* and the at least one door bracket 12*a*, 12*b* are configured to connect to one another using a connecting portion and a receiving slot configured to receive said connecting portion. The connecting portion is provided on the at least one door frame bracket 11*a*, 11*b*. The receiving slot is provided on the at least one door bracket 12*a*, 12*b*. The receiving slot extends along a side of the at least one door bracket 12*a*, 12*b* in an inwardly direction relative the door. Moreover, the receiving slot extends through the at least one door bracket 12*a*, 12*b* on the side opposite a mounting side of the at least one door bracket 12*a*, 12*b*. The connecting portion of the door frame bracket 11*a*, 11*b* is configured to enter the open end of the receiving slot when the at least one door frame bracket 11*a*, 11*b* and the at least one door bracket 12*a*, 12*b* connect. The keeping member 15 is configured to move linearly relative the at least one door bracket 12*a*, 12*b* in a slide channel. The slide channel extends into the receiving slot of the at least one door bracket 12*a*. The keeping member 15 can move linearly, or slide, in said slide channel into a keeping position where the keeping member 15 is positioned so that it covers the open end of the receiving slot. When in the keeping position, the keeping member 15 blocks the connecting portion from leaving the receiving slot, thereby keeping the at least one door frame bracket 11*a*, 11*b* and the at least one door bracket 12*a*, 12*b* connected, and consequently locking the door 100 to the door frame 110.

The keeping member 15 is coupled to the locking rod 20. The locking rod 20 may be a flat rod as depicted in FIGS. 1-11. The locking rod 20 is configured to move linearly relative said at least one door bracket 12*a*, 12*b* in said slide channel as well. By moving the locking rod 20 along said slide channel, the keeping member 15 is either moved into or out of the keeping position, depending on direction of movement of the locking rod 20. The movement of the locking rod 20 is controlled by the control mechanism 30 which is operatively coupled to a handle 50*a* and the locking rod 20. By moving the handle 50*a*, the locking rod 20 is actuated into movement, thereby moving the keeping member 15 about the keeping position, and in particular to move it out of the keeping position. Moreover, the locking rod 20 comprises a transversally displaced portion 20*a* relative a longitudinal axis of the locking rod 20. Specifically, the transversally displaced portion 20*a* is a portion in-between two aligned portions 20*b*, 20*c* of the locking rod 20. The locking mechanism 30 is arranged adjacent to the transversally displaced portion 20*a*. The locking mechanism 30 is coupled to the transversally displaced portion 20*a*. The transversally displaced portion 20*a*, and the aligned portions 20*b*, 20*c* are all parallel.

Figure 4:
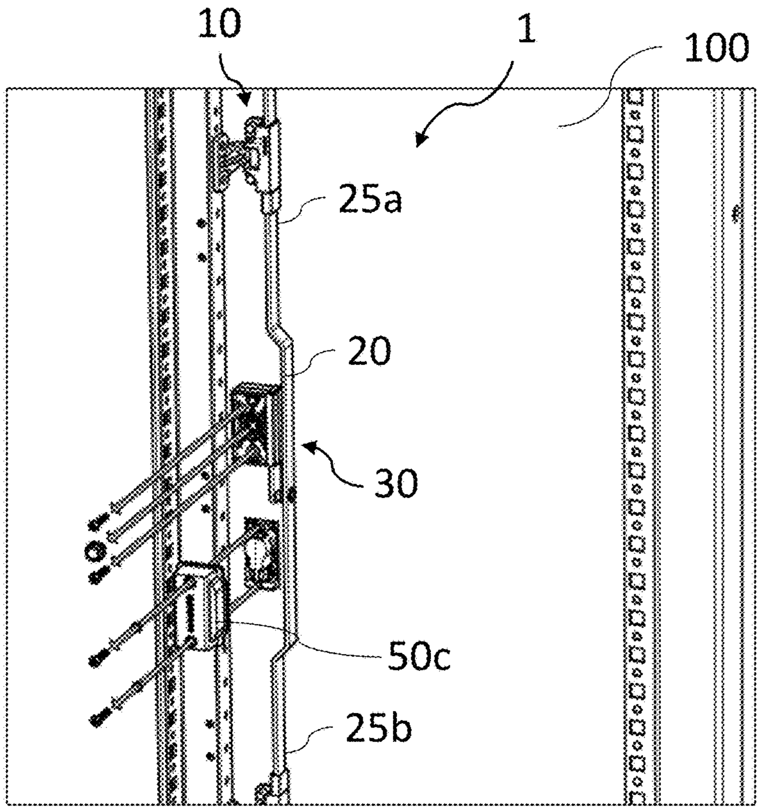
FIG. 4 shows a close-up perspective view of the locking assembly according to one embodiment of the invention when the control mechanism is being released.
Figure 5:
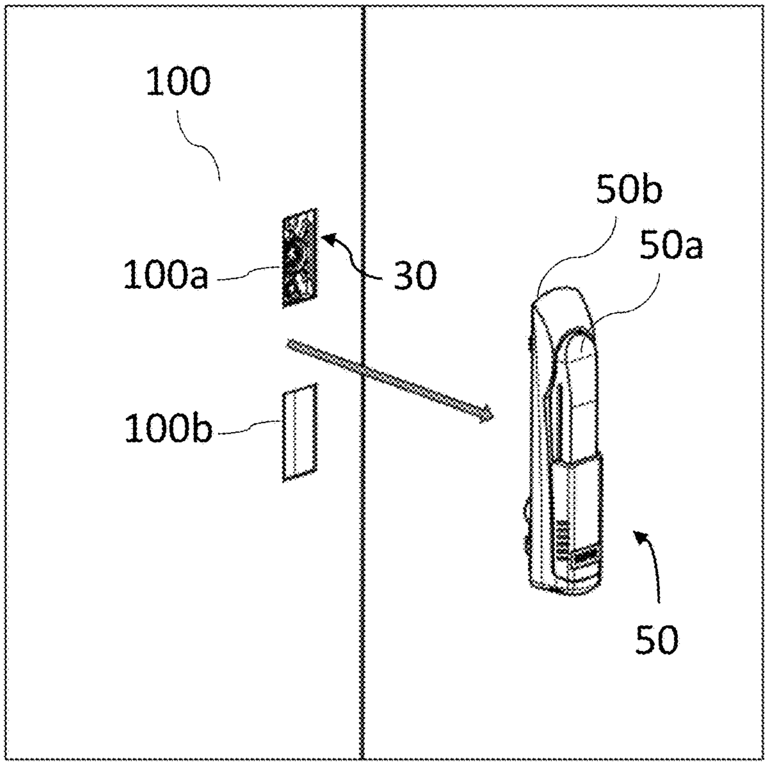
FIG. 5 shows a close-up perspective view of a door to which the locking assembly according to one embodiment of the invention is arranged.

The control mechanism 30 comprises a housing 31, a coupling member 32, and a control member 35. The housing 31 is provided with at least one mounting surface. The housing 31 is configured to be arranged adjacent to the door 100 so that the at least one mounting surface is facing the door 100, and in particular into a coupling aperture 100*a*, 100*b*, as illustrated in FIG. 5. The at least one mounting surface of the housing is provided with at least one and preferably two mounting areas. An aperture may traverse each mounting area, in which apertures fasteners may be positioned to secure the housing 31 to the door 100, or a handle 50*a* directly through the coupling aperture 100*a*, 100*b*. Fasteners may for example be screws, bolts and nuts, or other fastening means including mechanical and/or adhesive fasteners. The housing 31 is provided with a cavity to house the coupling member 32. Moreover, the housing 31 is provided with a sliding slot for slidable reception of the control member 35. The at least one mounting surface is open to expose the coupling member 32 arranged in the cavity. The coupling member 32 is provided with at least one coupling portion 32*a*, 32*b* for coupling to a handle 50*a*. The at least one coupling portion 32*a*, 32*b* may be accessed through the opening of said at least one mounting surface. A handle 50*a* may thus be coupled to the coupling portion 32*a*, 32*b* of the coupling member 32 through said opening of said at least one mounting surface and coupling aperture 100*a*, 100*b* of said door 100 to couple the handle 50*a* and the coupling member 32. In FIG. 5, a handle arrangement 50 is illustrated. The handle arrangement 50 comprises a handle 50*a*, a handle housing 50*b*. The handle arrangement 50 also comprises a fixating bracket 50*c* arranged on the opposite side of the door 100 relative the handle 50*a* and the handle housing 50*b*, as shown in FIG. 4.

The coupling member 32 comprises a cog or a cog-like portion. The cog-like portion extends along a rim of the coupling member 32. The cog or cog-like portion generally includes a plurality of teeth which are operatively engaged to a series of grooves integral to the control member 35. The control member 35 is configured to slide relative the housing 31 in the sliding slot. A portion of the control member 35 extends out of the housing 31 and is coupled to the locking rod 20. Hence, rotation of the handle 50*a* thereby imparts rotation to the coupling member 32 which translates the motion via the teeth to move the control member 35 in the sliding slot, thereby actuating movement of the locking rod 20 and consequently the keeping member 15 as well. By rotating the handle 50*a* to a pre-determined position, the keeping member 15 is moved out of the keeping position, thereby allowing the at least one door frame bracket 11*a*, 11*b* and the at least one door bracket 12*a*, 12*b* to release from one another.

The control mechanism 30 is configured to be arranged to the door 100 in a first operative position. By an operative position, it is meant that the control mechanism 30 is arranged fixedly in a position adjacent to the door 100 relative the at least one door bracket 12*a*, 12*b* while coupled to the locking rod 20 and the handle 50*a*, so as to be able to transfer a motion there in-between. The control mechanism 30 is configured to be releasable from the first operative position and to be reattached in at least a second operative position relative said at least one door bracket 12*a*, 12*b*. The coupling member 32 is provided with two coupling portions arranged on opposite sides. The housing 31 is provided with two mounting surfaces arranged on opposite sides. When in an operative position, one of the mounting surfaces is facing the door 100 and the coupling aperture 100*a*, 100*b*, wherein which one depends on which of the first and second operative position the control mechanism 30 is currently placed in.

The first operative position and the second operative position are associated with left hand- and right hand swing operative use of the door 100, respectively. Hence, by moving the control mechanism 30 between the first operative position and the second operative position, a door 100 may be reconfigured for left hand- or right hand swing operative use. The change in operative position may involve moving the control mechanism 30 to different positions relative the at least one door bracket 12*a*, 12*b*. Specifically, it may involve rotating the locking mechanism 30 so as to change which coupling portion 32*a*, 32*b* is exposed to be coupled to a handle 50*a*. The method of reconfiguring a door for either left hand or right hand operative use may also involve flipping the door 180 degrees, and it may also involve reposition of the hinges connecting the door 100 to the door frame 110.

As illustrated in FIGS. 1-11, the control member 35 is rotationally coupled to the locking rod 20. This allows the control mechanism 30 to rotate relative the locking rod 20 about a rotational axis A, when released from the first operative position. When released, the control mechanism 30 is able to rotate between the first operative position to the second operative position. This allows for a quick and efficient reconfiguring of a door for left hand or right hand swing operative use. Only the control mechanism 30, the door frame brackets 11*a*, 11*b* and the door frame hinges needs to be repositioned. The angle between respective orientation of the control mechanism 30 in the first operative position and the second operative position is about 180 degrees.

Figure 2:
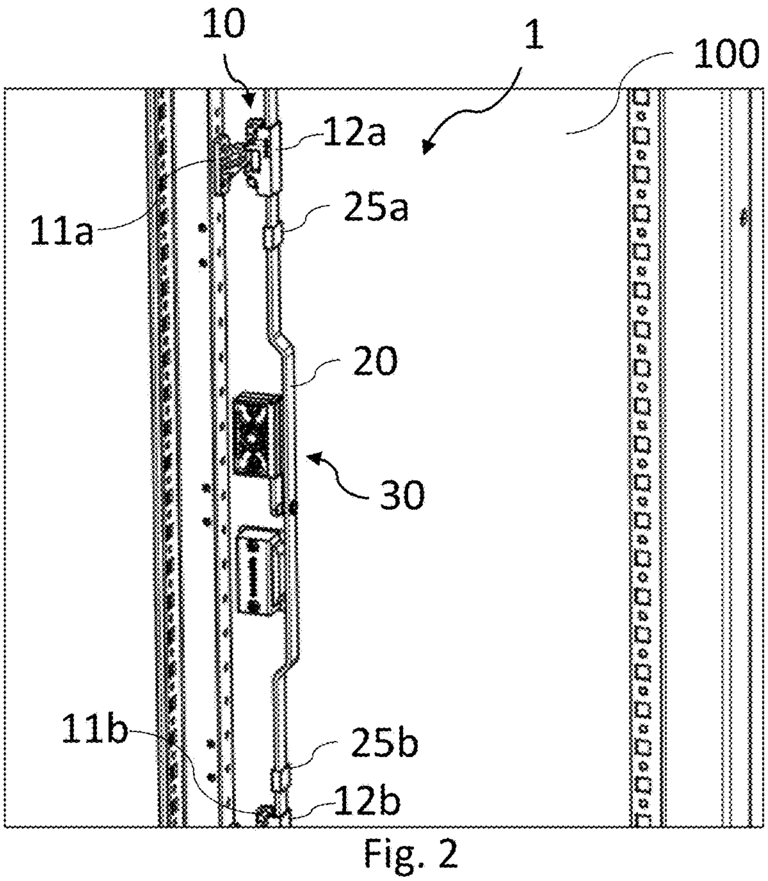
FIG. 2 shows a close-up perspective view of the locking assembly according to one embodiment of the invention when in use.
Figure 3:
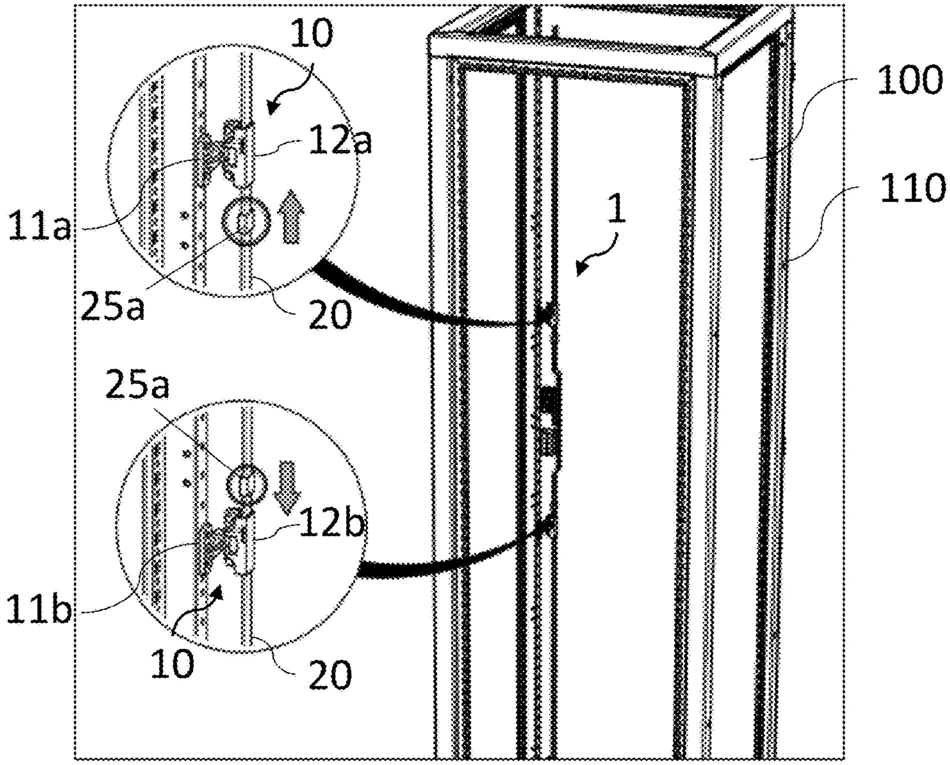
FIG. 3 shows a perspective view of the locking assembly according to one embodiment of the invention when in use.

FIG. 2 shows a close-up perspective view of the locking assembly 1 according to one embodiment of the invention when in use, and FIG. 3 shows a perspective view of the locking assembly 1 according to one embodiment of the invention, also when in use. The locking assembly 1 is arranged to a locker, specifically a locker door 100 and a locker door frame 110. Specifically, the door frame brackets 11*a*, 11*b* are arranged to the door frame 110, and the door brackets 12*a*, 12*b*, the control mechanism 30 and the locking rod 20 are arranged to the door 100. Moreover, the locking rod 20 may be provided with locking rod stops 25*a*, 25*b* configured to limit the range of motion of the locking rod 20 by abutting a door bracket 12*a*, 12*b*. In one exemplary embodiment, the locking rod stops 25*a*, 25*b* are clamped in place onto the locking rod 20. The position of the locking rod stops 25*a*, 25*b* may be repositioned to adjust the range of motion of the locking rod 20. The locking assembly 1 is arranged to the door 100 and configured for left hand swing operative use, see FIGS. 2-3.

Figure 6:
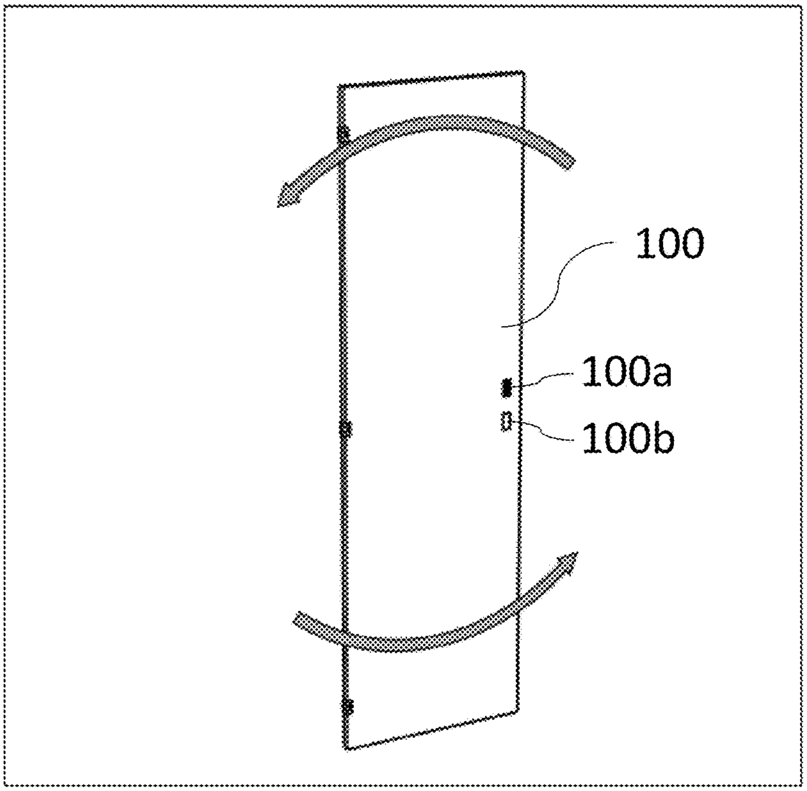
FIG. 6 shows a perspective view of a door to which the locking assembly according to one embodiment of the invention is arranged.
Figure 7:
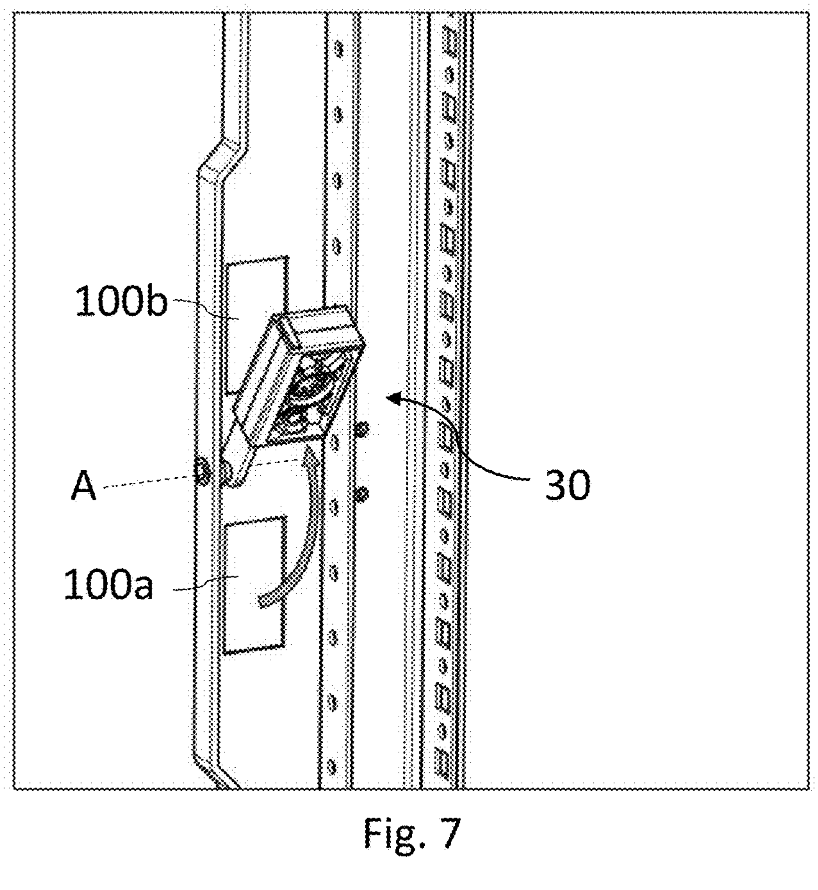
FIG. 7 shows a close-up perspective view of the locking assembly according to one embodiment of the invention when the control mechanism is being moved.
Figure 8:
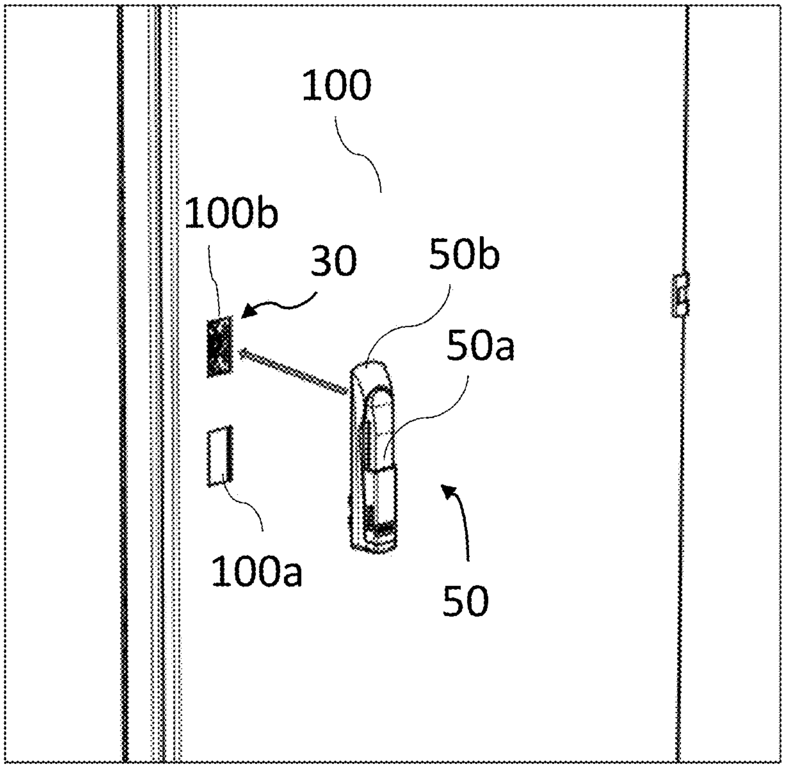
FIG. 8 shows a close-up perspective view of a door to which the locking assembly according to one embodiment of the invention is arranged.
Figure 9:
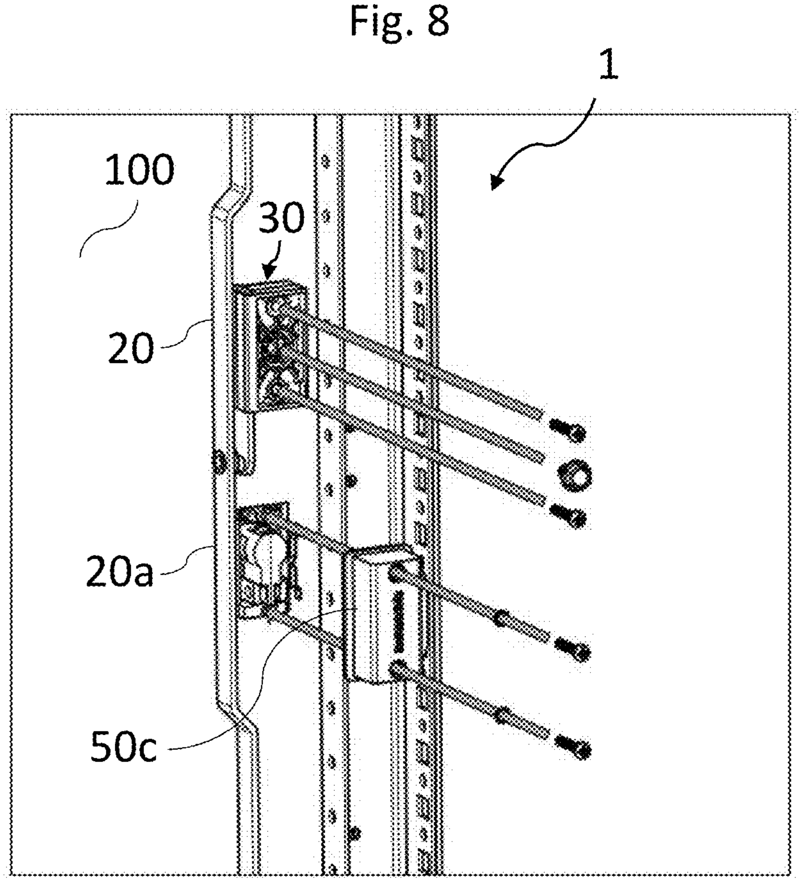
FIG. 9 shows a close-up perspective view of the locking assembly according to one embodiment of the invention when the control mechanism is being reattached.
Figure 10:
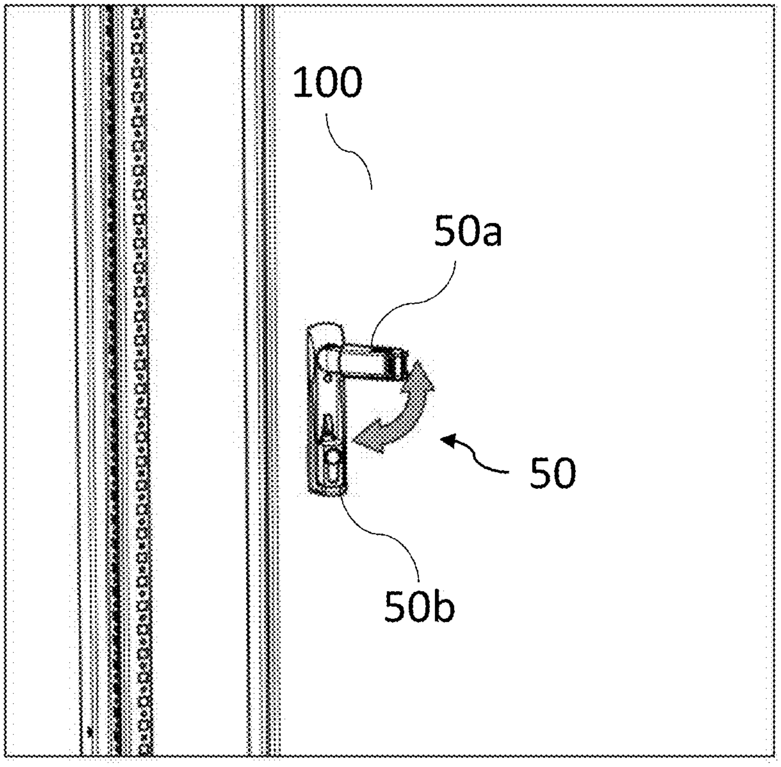
FIG. 10 shows a perspective view of a door to which the locking assembly according to one embodiment of the invention is arranged.
Figure 11:
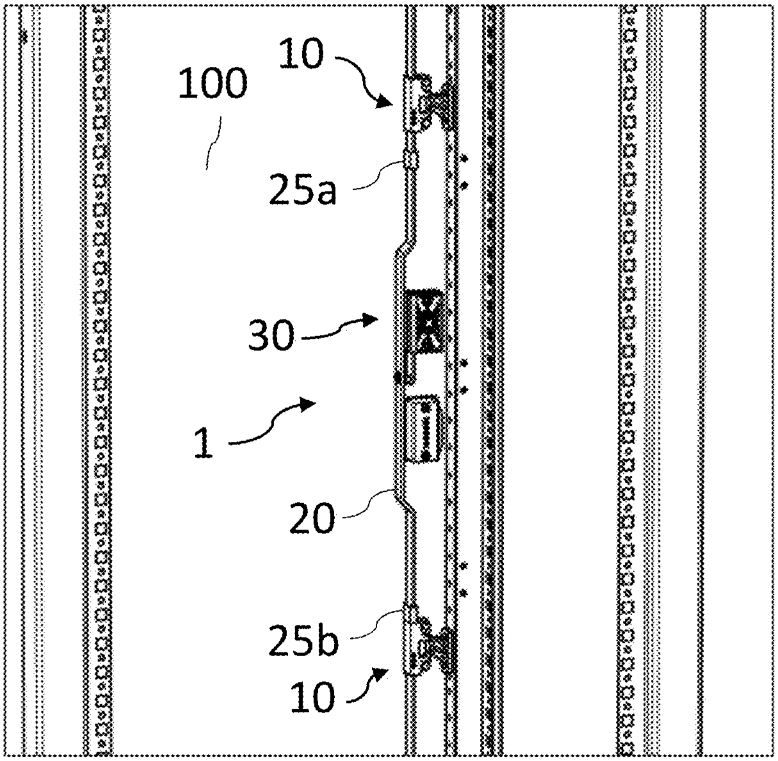
FIG. 11 shows a perspective view of the locking assembly according to one embodiment of the invention.

As previously stated, the control mechanism 30 is configured to be releasable from a first operative position and moveable to a second operative position. The process or method of moving the control mechanism 30 from a first operative position to a second operative position is illustrated in FIGS. 4-11. First, the method comprises a step of releasing the control mechanism 30 from a first operative position. This may involve removing fasteners fixating the housing 31 in position adjacent to the door 100, from the handle arrangement 50, and the coupling member 32 from the handle 50*a*. Also, a fixating bracket 50*c* may need to be removed from the handle arrangement 50 as well, which fixating bracket 50*c* is arranged to couple to the handle arrangement 50 through one of the coupling apertures 100*a*, 100*b*. The method further comprises a step of removing the handle arrangement 50 from the door, as seen in FIG. 5. The method further comprises a step of flipping the door 180 degrees as indicated by FIG. 6. The method further comprises a step of moving the control mechanism 30 from the first operative position to the second operative position, so that a coupling portion 32*a*, 32*b* of the coupling member 32 may couple to a handle 50*a* through a different coupling aperture 100*a*, 100*b*. This may involve rotating the control mechanism 30 about a pivot axis A. The method further comprises a step of attaching the handle arrangement 50 to the door 100 as indicated in FIG. 8. Now, the handle 50*a* is oriented such that it will couple to the coupling member 32 through coupling aperture 100*b* rather than 100*a*. The method further comprises a step of securely arranging the control mechanism 30 in the second operative position as shown in FIG. 9. This involves securing the housing 31 to the handle arrangement 50 by inserting screws through each mounting area, and connecting the coupling member 32 to the handle 50*a*. Also, the fixating bracket 50*c* is also arranged in place to fixate the handle arrangement 50 in position. The locking assembly 1 is then appropriately arranged to allow locking and unlocking of the door 100 by rotating the handle 50*a*, as indicated by FIGS. 10 and 11, in a right hand swing operative use.

This completes the detailed description of a particular embodiment of the present invention. In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A locking assembly for a door, the locking assembly comprising:
- a locking mechanism configured to lock a door to a door frame in a locking state;
- at least one door bracket by which the locking mechanism is arranged to the door;
- a control mechanism comprising a housing, and a coupling member configured to connect to a handle, wherein the control mechanism, in a first operative position relative said at least one door bracket, is configured to actuate the locking mechanism out of the locking state by operatively moving the coupling member relative the housing in a first direction,
- wherein the control mechanism is configured to be moved from the first operative position relative said at least one door bracket to a second operative position relative said at least one door bracket different from said first operative position, in which second operative position the control mechanism is configured to actuate the locking mechanism out of the locking state by operatively moving the coupling member relative the housing in a second direction,
- wherein the coupling member is configured to engage with a control member configured to move linearly relative the housing, wherein the control member is coupled to a locking rod, wherein the control mechanism is pivotably coupled to the locking rod via the control member to be pivotable between the first operative position and the second operative position,
- wherein the coupling member comprises two substantially identical coupling portions arranged on opposite sides of the coupling member, by which coupling portions the control mechanism is configured to couple to the handle.

2. The locking assembly according to claim 1, wherein the coupling member is rotatable relative the housing, and is provided with cog teeth configured to engage with the control member configured to move linearly relative the housing, wherein the control member is coupled to the locking rod.

3. The locking assembly according to claim 2, wherein the control member is arranged to move linearly relative the housing in a control slot positioned at a housing side adjacent to the locking rod.

4. The locking assembly according to claim 2, wherein the control member and the locking rod are mutually parallel when the control mechanism is positioned in an operative position.

5. The locking assembly according to claim 1, wherein the coupling member is provided with a coupling aperture traversing through the coupling member between said coupling portions, the coupling aperture configured to receive a handle.

6. The locking assembly according to claim 1, wherein the control mechanism is configured to be pivotable around an axis perpendicular to a longitudinal axis of the locking rod.

7. The locking assembly according to claim 1, wherein the locking rod comprises a portion transversally displaced from a longitudinal axis of the locking rod.

8. The locking assembly according to claim 7, wherein the control mechanism is coupled to the transversally displaced portion of the locking rod.

9. The locking assembly according to claim 1, wherein the control mechanism comprises a through-hole for receiving a screw to secure the control mechanism in an operative position.

10. A door comprising a locking assembly according to claim 1, and a handle arrangement operatively connected to the locking assembly.

11. Method of reconfiguring a door between left hand swing operative use and right hand swing operative use,
- wherein the door comprises a locking assembly and a handle arrangement operatively connecting to the locking assembly,
- wherein the locking assembly comprises a locking mechanism configured to lock a door to a door frame in a locking state;

at least one door bracket by which the locking mechanism is arranged to the door;

a control mechanism comprising a housing, and a coupling member configured to connect to a handle, wherein the control mechanism, in a first operative position relative said at least one door bracket, is configured to actuate the locking mechanism out of the locking state by operatively moving the coupling member relative the housing in a first direction, wherein the control mechanism is configured to be moved from the first operative position relative said at least one door bracket to a second operative position relative said at least one door bracket different from said first operative position, in which second operative position the control mechanism is configured to actuate the locking mechanism out of the locking state by operatively moving the coupling member relative the housing in a second direction, wherein the coupling member is configured to engage with a control member configured to move linearly relative the housing, wherein the control member is coupled to the locking rod, wherein the control mechanism is pivotably coupled to the locking rod via the control member to be pivotable between the first operative position and the second operative position, wherein the coupling member comprises two substantially identical coupling portions arranged on opposite sides of the coupling member, by which coupling portions the control mechanism is configured to couple to the handle, wherein the method comprises the steps of:

releasing the control mechanism from a first operative position;

removing the handle arrangement from the door;

moving the control mechanism from the first operative position to the second operative position;

reorienting the door;

reattaching the handle arrangement to the door;

reattaching the control mechanism to the handle arrangement.

12. A method of using a locking assembly for reconfiguring a door between left hand swing operative use and right hand swing operative use, wherein the method comprises:

providing a locking assembly, wherein the locking assembly comprises:

a locking mechanism configured to lock a door to a door frame in a locking state;

at least one door bracket by which the locking mechanism is arranged to the door;

a control mechanism comprising a housing, and a coupling member configured to connect to a handle, wherein the control mechanism, in a first operative position relative said at least one door bracket, is configured to actuate the locking mechanism out of the locking state by operatively moving the coupling member relative the housing in a first direction, wherein the control mechanism is configured to be moved from the first operative position relative said at least one door bracket to a second operative position relative said at least one door bracket different from said first operative position, in which second operative position the control mechanism is configured to actuate the locking mechanism out of the locking state by operatively moving the coupling member relative the housing in a second direction, wherein the coupling member is configured to engage with a control member configured to move linearly relative the housing, wherein the control member is coupled to the locking rod, wherein the control mechanism is pivotably coupled to the locking rod via the control member to be pivotable between the first operative position and the second operative position, wherein the coupling member comprises two substantially identical coupling portions arranged on opposite sides of the coupling member, by which coupling portions the control mechanism is configured to couple to a handle; and operating the locking assembly to reconfigure the door between left hand swing operative use and right hand swing operative use.

* * * * *